(12) United States Patent
Kanda

(10) Patent No.: US 9,106,825 B2
(45) Date of Patent: Aug. 11, 2015

(54) IMAGE CAPTURE APPARATUS, IMAGE CAPTURE METHOD AND STORAGE MEDIUM

(71) Applicant: CANON KABUSHIKI KAISHA, Tokyo (JP)

(72) Inventor: Akihiko Kanda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/146,983

(22) Filed: Jan. 3, 2014

(65) Prior Publication Data
US 2014/0218595 A1 Aug. 7, 2014

(30) Foreign Application Priority Data

Feb. 7, 2013 (JP) ................................. 2013-022395

(51) Int. Cl.
*H04N 5/232* (2006.01)
*H04N 5/369* (2011.01)
*H04N 5/343* (2011.01)

(52) U.S. Cl.
CPC ....... *H04N 5/23212* (2013.01); *H04N 5/23245* (2013.01); *H04N 5/343* (2013.01); *H04N 5/3696* (2013.01)

(58) Field of Classification Search
CPC . H04N 5/2356; H04N 5/23212; G03B 13/20; G02B 7/285; G02B 7/36; G02B 7/365; G02B 7/38

USPC .................................................. 348/345–356
See application file for complete search history.

(56) References Cited

U.S. PATENT DOCUMENTS

2011/0304765 A1\* 12/2011 Yogo et al. .................... 348/345
2013/0010179 A1\* 1/2013 Takahara et al. .............. 348/353

FOREIGN PATENT DOCUMENTS

JP 2003-156677 A 5/2003

\* cited by examiner

*Primary Examiner* — Mekonnen Dagnew
(74) *Attorney, Agent, or Firm* — Canon USA Inc. IP Division

(57) ABSTRACT

An image capture apparatus includes an image capture unit, a first focus detection unit configured to perform phase difference type focus detection for detecting a deviation amount between a pair of object images acquired from output signals output from the image capture unit, a second focus detection unit configured to perform contrast type focus detection for detecting contrast information of an object image acquired from an output signal output from the image capture unit, a contrast information generation unit configured to generate the contrast information in a plurality of distance measurement areas subjected to focus detection by the second focus detection unit, and an area determination unit configured to determine, based on the contrast information, a distance measurement area to be subjected to focus detection by the first focus detection unit.

7 Claims, 20 Drawing Sheets

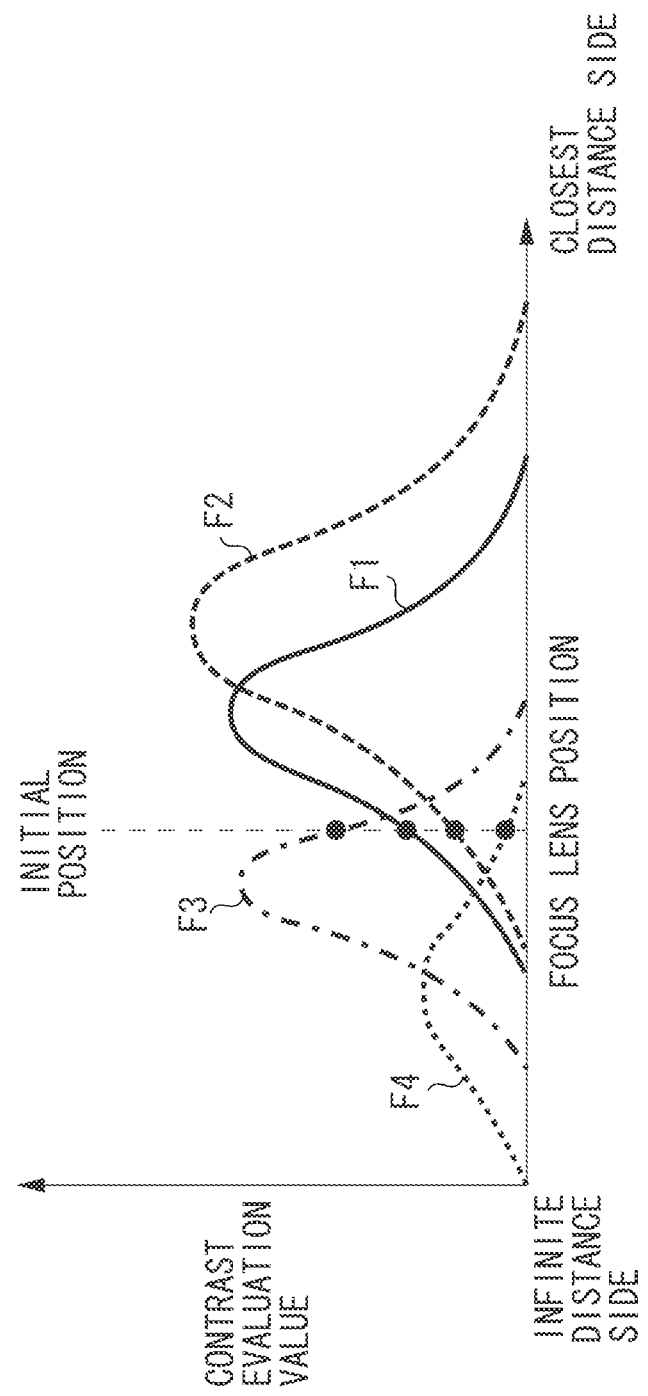

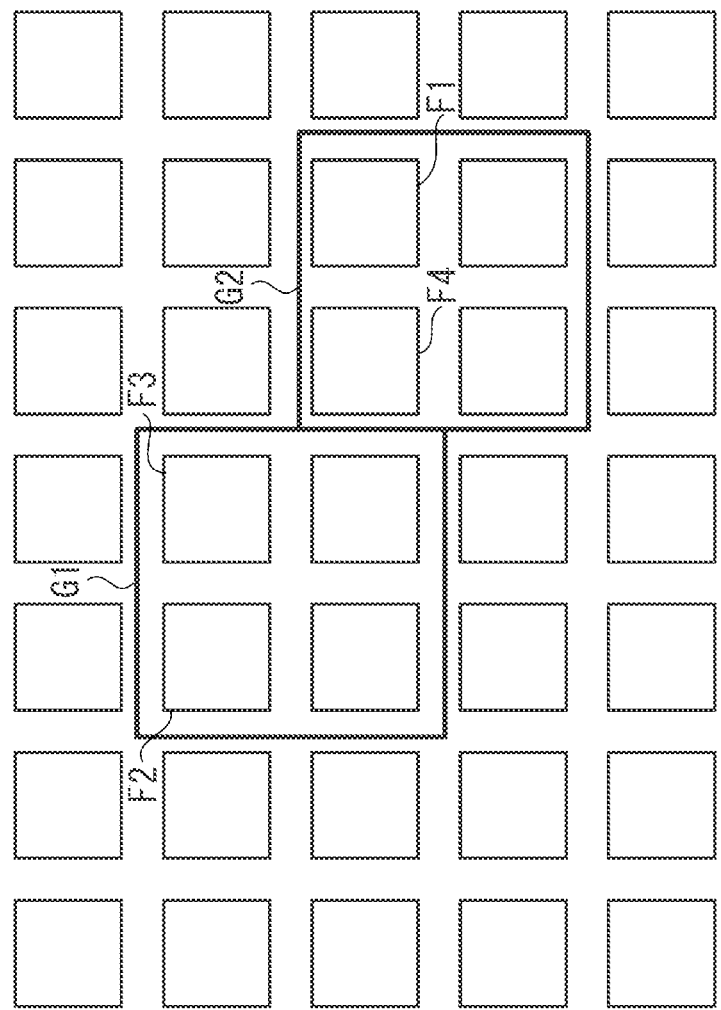

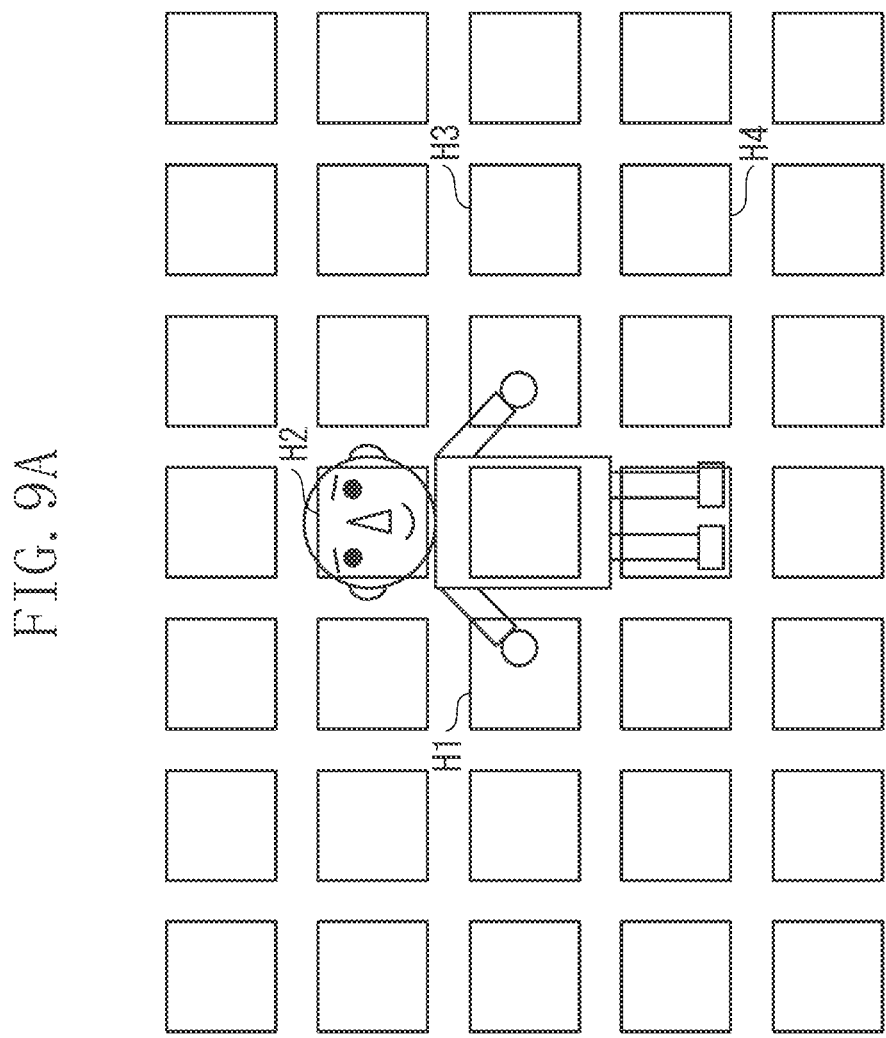

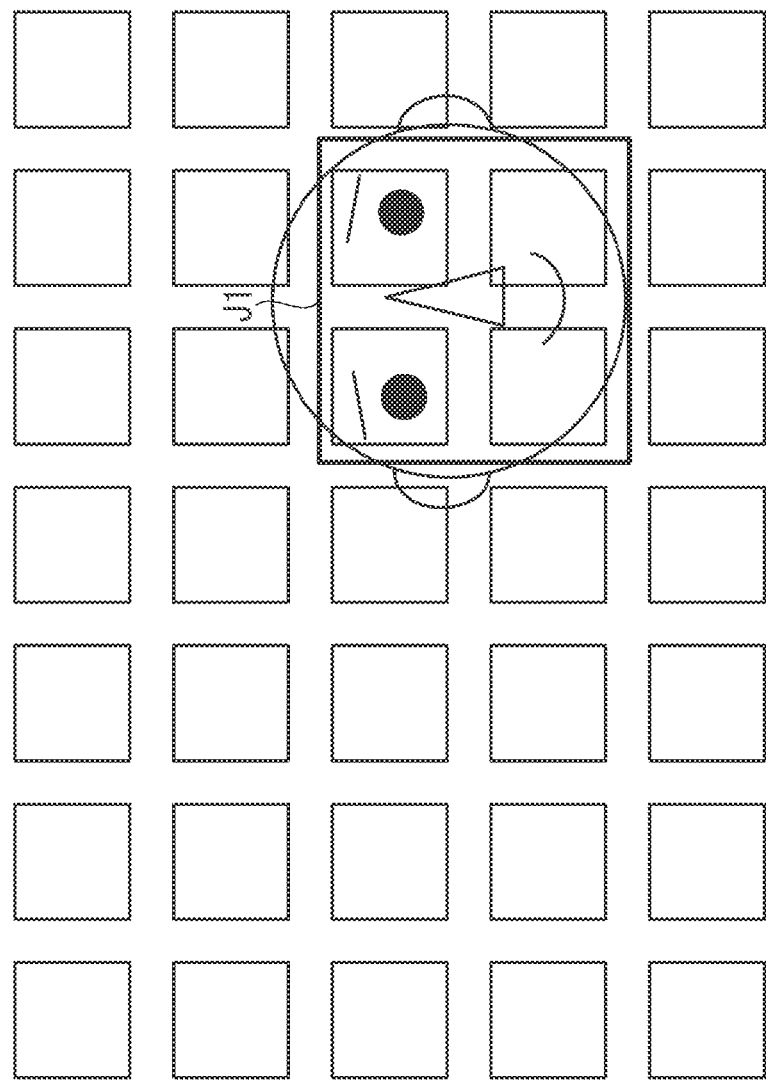

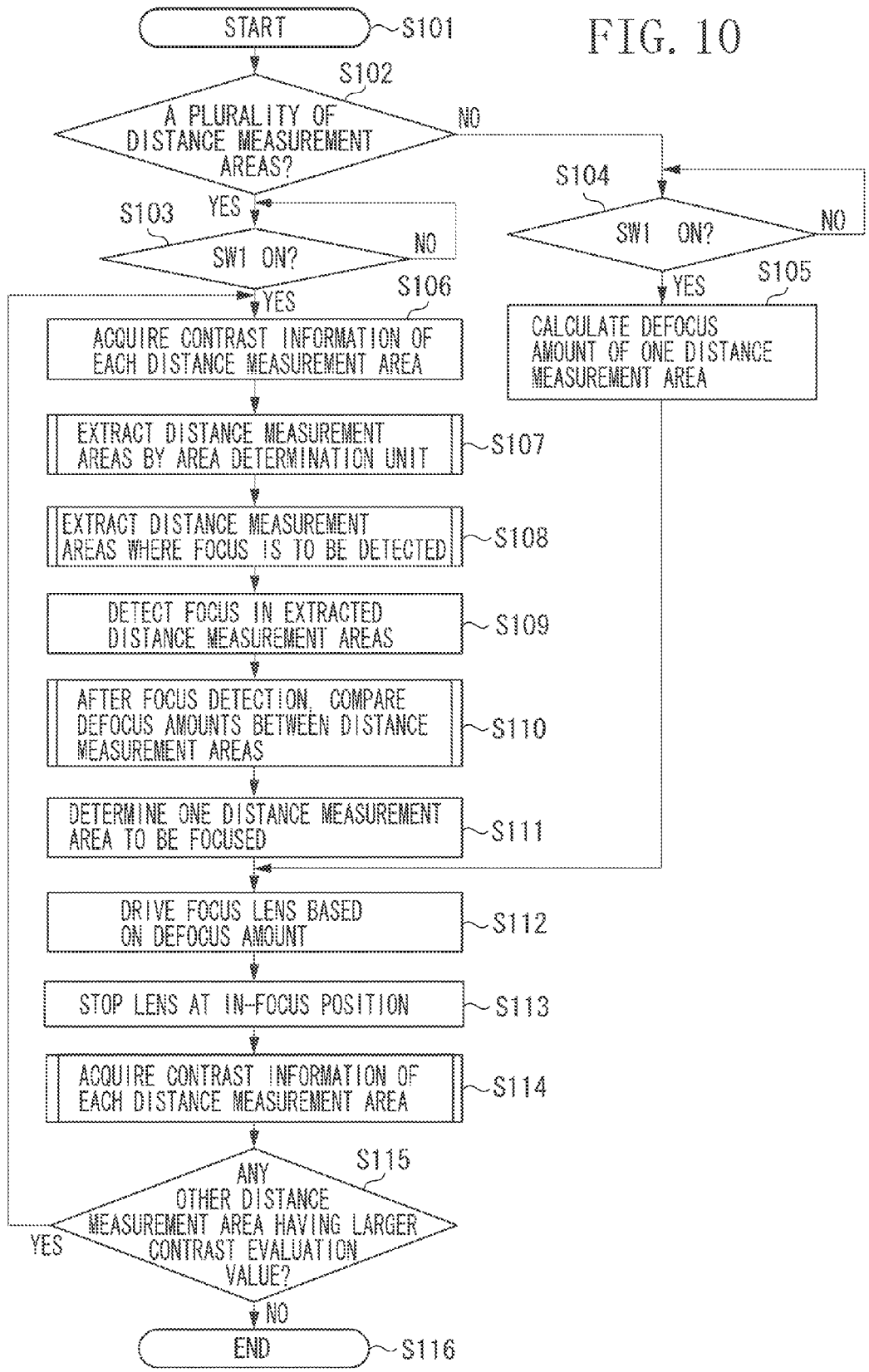

IMAGE CAPTURE APPARATUS, IMAGE CAPTURE METHOD AND STORAGE MEDIUM

BACKGROUND OF THE INVENTION

1. Field of the Invention

The present disclosure generally relates to imaging and, more particularly, to an image capture apparatus having an autofocus function.

2. Description of the Related Art

Conventionally, as a general method used for autofocusing (hereinafter, AF) of the image capture apparatus, there are known a phase difference detection method and a contrast detection method. In the phase difference detection method, a light flux that has passed through an exit pupil of a photographic lens is divided into two, the two divided light fluxes are respectively received by a set of focus detection sensors, and a deviation amount between signals output according to the received light amounts, namely, a deviation amount between relative positions of the light fluxes in the dividing direction, is detected to directly acquire a deviation amount in a focus direction of the photographic lens.

Thus, once a storage operation is carried out by the focus detection sensors, an out-of-focus amount and a direction are acquired, thereby enabling a high-speed focus adjustment operation. However, to divide the light flux that has passed through the exit pupil of the photographic lens and acquire the signals corresponding to the respective light fluxes, two sets of a focus detection optical system and a sensor are generally provided, and a detected deviation amount between the signals needs to be converted into an out-of-focus amount.

Unlike the above-described phase difference detection method, in the other method, namely, the contrast detection method, an image sensor is used as a focus detection sensor. This is a method that focuses attention on an output signal of the image sensor, especially a high-frequency component signal, and sets the position of the photographic lens, where a contrast evaluation value indicating the contrast of an object image is largest, as an in-focus position.

The contrast detection method is, however, also referred to as a hill-climbing method. The contrast evaluation value needs to be acquired while driving the photographic lens, and the position where the contrast evaluation value is largest needs to be searched for. Thus, this method is not suitable for a high-speed focus adjustment operation. On the other hand, the method has the advantage of high focusing accuracy because the contrast is evaluated by using the signal acquired from the image sensor.

Recently, Japanese Patent Application Laid-Open No. 2003-156677 has discussed a phase difference detection method using an image sensor that is realized by including a focus detection unit therein.

In the technique discussed in Japanese Patent Application Laid-Open No. 2003-156677, each pixel of the image sensor includes two photoelectric conversion areas, a solid-state image sensor having an output system capable of obtaining signals from a plurality of photoelectric conversion areas and outputting signals separately for each photoelectric conversion area, and a calculation unit that calculates a phase difference and a contrast evaluation value of an object image from the signal output from each of the plurality of photoelectric conversion areas. A focus lens is driven based on the phase difference to perform focusing control, and then the focus lens is driven based on the contrast evaluation value to perform focusing control.

In the technique discussed in Japanese Patent Application Laid-Open No. 2003-156677, the focusing control is easily performed when the number of distance measurement areas is one. However, in the image plane phase difference detection method, if there is a plurality of distance measurement areas, to detect a defocus amount indicating an out-of-focus amount of an imaging optical system, signals output from the two photoelectric conversion areas of each pixel of the plurality of distance measurement areas need to be separately read, and simultaneously subjected to calculation processing. Consequently, there is a possibility that a calculation load and a circuit size will increase. Thus, to detect a phase difference on the image plane in the case of the plurality of distance measurement areas, the distance measurement areas need to be subjected to calculation processing one by one, taking time until an in-focus state is set.

SUMMARY OF THE INVENTION

The present disclosure is directed to an image capture apparatus including an image sensor capable of detecting a phase difference, which can reduce focusing time even when there is a plurality of distance measurement areas.

According to an aspect of the present disclosure, an image capture apparatus includes an image capture unit, a first focus detection unit configured to perform phase difference type focus detection for detecting a deviation amount between a pair of object images acquired from output signals output from the image capture unit, a second focus detection unit configured to perform contrast type focus detection for detecting contrast information of an object image acquired from an output signal output from the image capture unit, a contrast information generation unit configured to generate the contrast information in a plurality of distance measurement areas subjected to focus detection by the second focus detection unit, and an area determination unit configured to determine, based on the contrast information, a distance measurement area to be subjected to focus detection by the first focus detection unit.

Further features of the present disclosure will become apparent from the following description of exemplary embodiments with reference to the attached drawings.

BRIEF DESCRIPTION OF THE DRAWINGS

FIGS. 8A and 8B are diagrams respectively illustrating contrast information of each distance measurement area according to the present exemplary embodiment, and a determination method of the distance measurement area according to the present exemplary embodiment.

FIGS. 9A and 9B are diagrams illustrating a determination method of the distance measurement area when a face is included according to the present exemplary embodiment.

FIG. 10 is a flowchart according to the present exemplary embodiment.

DESCRIPTION OF THE EMBODIMENTS

Various exemplary embodiments, features, and aspects of the disclosure will be described in detail below with reference to the drawings.

An image capture method according to an exemplary embodiment of the present disclosure includes performing phase difference type focus detection for detecting a deviation amount between a pair of object images acquired from output signals output from the image capture unit, performing contrast type focus detection for detecting contrast information of an object image acquired from an output signal output from the image capture unit, generating the contrast information of a plurality of distance measurement areas subjected to the contrast type focus detection, and based on the contrast information, determining a distance measurement area to be subjected to the phase difference type focus detection.

Figure 1:
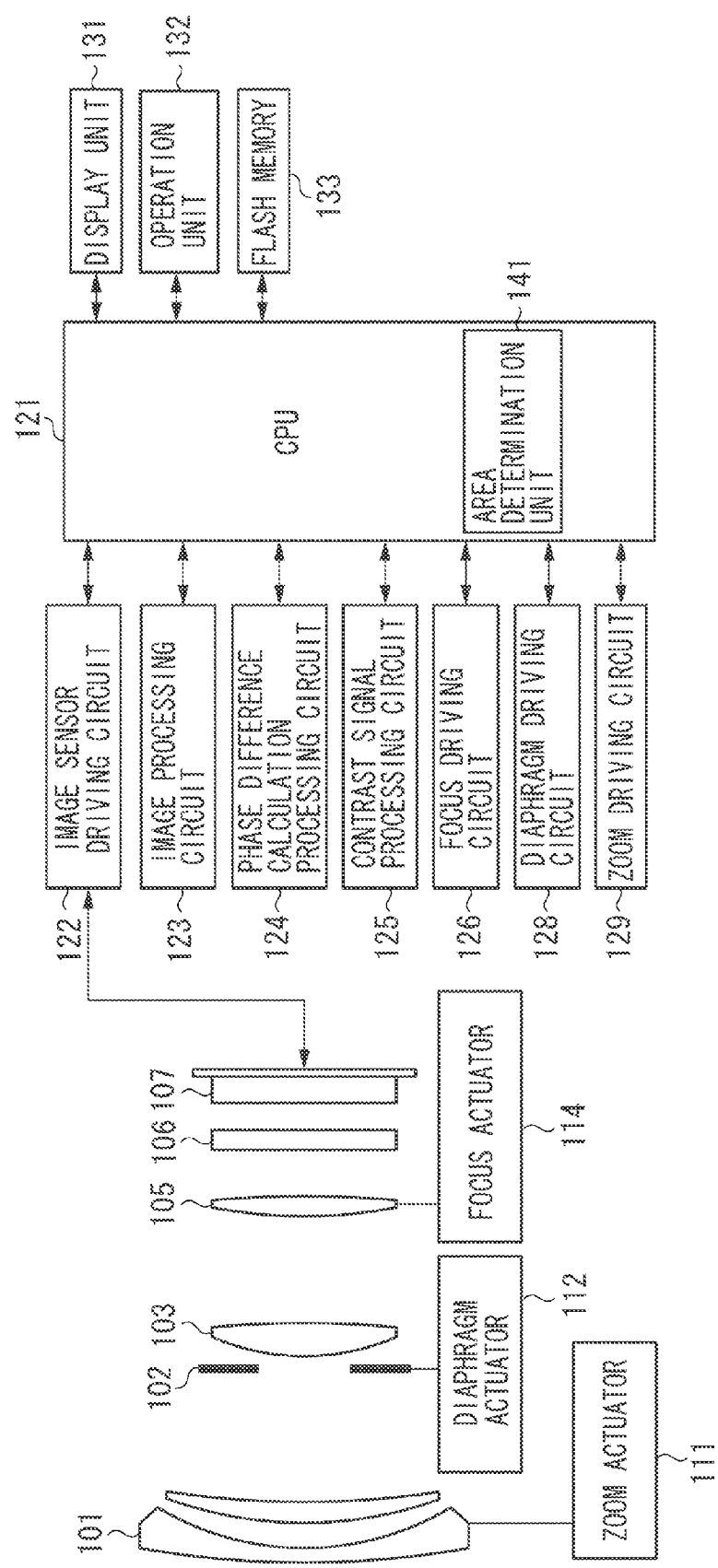
FIG. 1 is a block diagram illustrating a camera according to an exemplary embodiment of the present invention.

FIG. 1 is a block diagram of an image capture apparatus according to an exemplary embodiment of the present disclosure, illustrating an electronic camera configured by integrating a photographic optical system and a camera body including an image sensor, which can record a moving image and a still image. In FIG. 1, a first lens group 101 disposed at a leading end of the photographic optical system (imaging optical system) is held to be movable in an optical axis direction. A diaphragm unit 102 performs light amount adjustment by adjusting its aperture diameter during photographing, and also functions as an exposure time adjustment shutter during still image capturing. As used herein, the term "unit" generally refers to any combination of software, firmware, hardware, or other component that is used to effectuate a purpose.

A second lens group 103 is driven in the optical axis direction integrally with the diaphragm unit 102, and perform a variable magnification operation (zoom function) interlocked with a moving operation of the first lens group 101.

A third lens group 105 is moved in the optical axis direction to perform focus adjustment. An optical low-pass filter 106 is an optical element for reducing a false color or moire of a captured image.

An image sensor 107, which serves as an image capture unit having focus detectable pixels, includes a complementary metal-oxide semiconductor (CMOS) sensor and its peripheral circuit. The image sensor uses a two-dimensional single plate color sensor where light-receiving pixels having M pixels in a horizontal direction and N pixels in a vertical direction are arranged in a square matrix and primary color mosaic filters of a Bayer array are formed on-chip.

A zoom actuator 111 rotates a cam barrel (not illustrated) manually or by an actuator, thereby driving the first lens group 101 or the third lens group 105 in the optical axis direction to perform a variable magnification operation. A diaphragm actuator 112 controls the aperture diameter of the diaphragm unit 102 to adjust a photographing light amount, and performs exposure time control during still image capturing. A focus actuator 114 drives the third lens group 105 in the optical axis direction to perform focus adjustment.

A central processing unit (CPU) 121 includes a calculation unit, a read-only memory (ROM), a random access memory (RAM), an audio/digital (A/D) converter, a D/A converter, and a communication interface circuit to perform various types of control of the camera body. Based on a predetermined program stored in the ROM, the CPU 121 drives various circuits included in the camera to execute a series of operations including focus adjustment (autofocus (AF)), photographing, image processing, and recording.

(Circuit Configuration)

An image sensor driving circuit 122 controls an image capturing operation of the image sensor 107, and subjects an acquired image signal to A/D conversion to transmit the converted signal to the CPU 121. An image processing circuit 123 performs processing, such as color interpolation, gamma conversion, and image compression, on an image captured by the image sensor 107.

A phase difference calculation processing circuit 124, which serves as a focus detection unit, separately captures signals acquired from two photoelectric conversion areas of each pixel of the image sensor 107 to read an image A signal for AF and an image B signal for AF, and acquires an image deviation amount between the image A and the image B by correlation calculation to calculate an out-of-focus amount. A contrast signal processing circuit 125, which serves as a contrast information generation unit, performs gamma processing or various filter processing on an output signal (image capture signal) from the image sensor 107 to determine a high-frequency component of the signal, thereby generating a contrast evaluation value.

A focus driving circuit 126 controls driving of the focus actuator 114 based on a focus detection result, and drives the third lens group 105 in the optical axis direction to perform focus adjustment. A diaphragm driving circuit 128 controls driving of the diaphragm actuator 112 to control the aperture of the diaphragm unit 102. A zoom driving circuit 129 drives the zoom actuator 111 according to the zoom operation by a photographer.

A display unit 131 such as a liquid crystal display (LCD) displays information regarding a photographing mode of the camera, a preview image before photographing, a confirmation image after photographing, and an in-focus state display image during focus detection. An operation unit 132 is an operation switch group including a power switch, a photographing start switch, a zoom operation switch, and a photographing mode selection switch. A detachable flash memory 133 records captured images including a moving image and a still image.

An area determination unit 141 narrows down distance measurement areas based on contrast information. Based on contrast information of a plurality of distance measurement areas, the area determination unit 141 narrows down distance measurement areas to be subjected to focus detection by an image plane phase difference detection method for detecting a deviation amount between a pair of object images acquired from output signals output from the image capture unit.

(Pixel Array)

Figure 2:
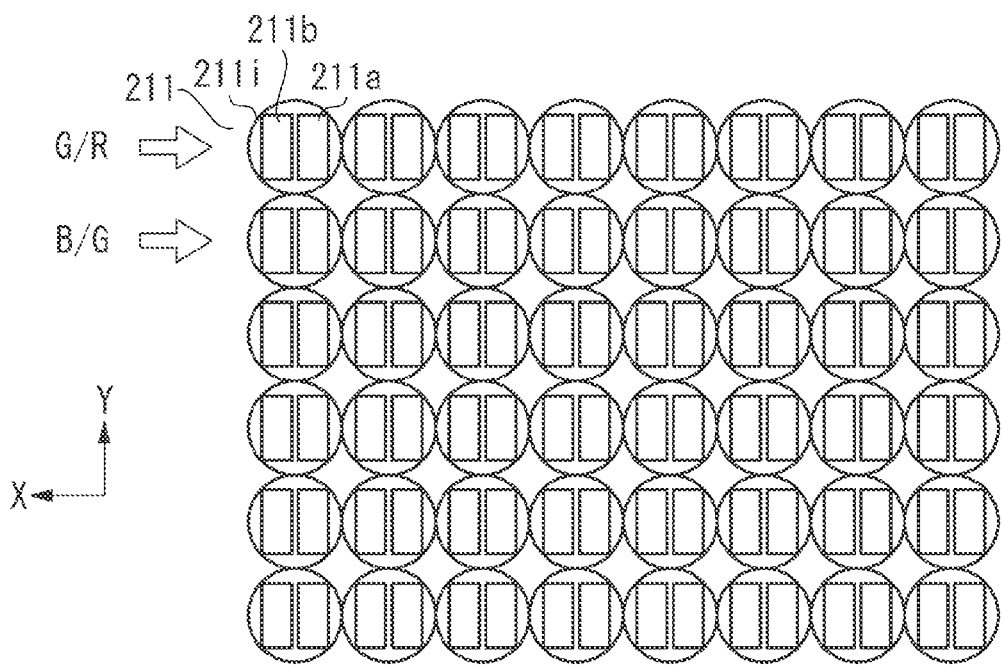
FIG. 2 is a diagram illustrating a pixel array of an image sensor according to the present exemplary embodiment.

FIG. 2 is a diagram of a pixel array of the image sensor 107 serving as the image capture unit according to the first exemplary embodiment of the present disclosure, illustrating a state of observing a range of the two-dimensional CMOS sensor, namely, 6 rows in a vertical (Y) direction and 8 columns in a horizontal (X) direction from the photographic optical system side. A Bayer array is applied for color filters. In the pixels of odd-numbered rows, green and red color filters are alternately arranged sequentially from left. In the pixels of even-numbered rows, blue and green color filters are alternately arranged sequentially from left. In an on-chip microlens 211i indicated by a circle, a plurality of rectangular photoelectric conversion units is disposed.

In the present exemplary embodiment of the present disclosure, the photoelectric conversion units of all the pixels are divided into two in an X direction, and a photoelectric conversion signal of each divided area can be independently read. The independently read signal can be used for performing image plane phase difference focus detection using a method described below, and generating a three-dimensional (3D) image including a plurality of images having parallax information. On the other hand, information adding together the outputs of the divided photoelectric conversion units is used as a normal captured image.

Here, pixel signals used when image plane phase difference focus detection is performed by a first focus detection unit to detect a deviation amount between a pair of object images acquired from output signals output from the image capture unit will be described. In the present exemplary embodiment of the present disclosure, an exit light flux of the photographic optical system is subjected to pupil division by the on-chip microlens 211i and the divided photoelectric conversion units 211a and 211b illustrated in FIG. 2. An image formed by connecting together the outputs of the photoelectric conversion units 211a in a plurality of photographing pixels 211 within a predetermined range on the same row is set as an image A for AF, and similarly an image formed by connecting together the outputs of the photoelectric conversion units 211b is set as an image B for AF. By detecting a relative image deviation amount between the generated images A and B for AF through correlation calculation, an out-of-focus amount, namely, a defocus amount, of a predetermined area can be detected.

Figure 3:
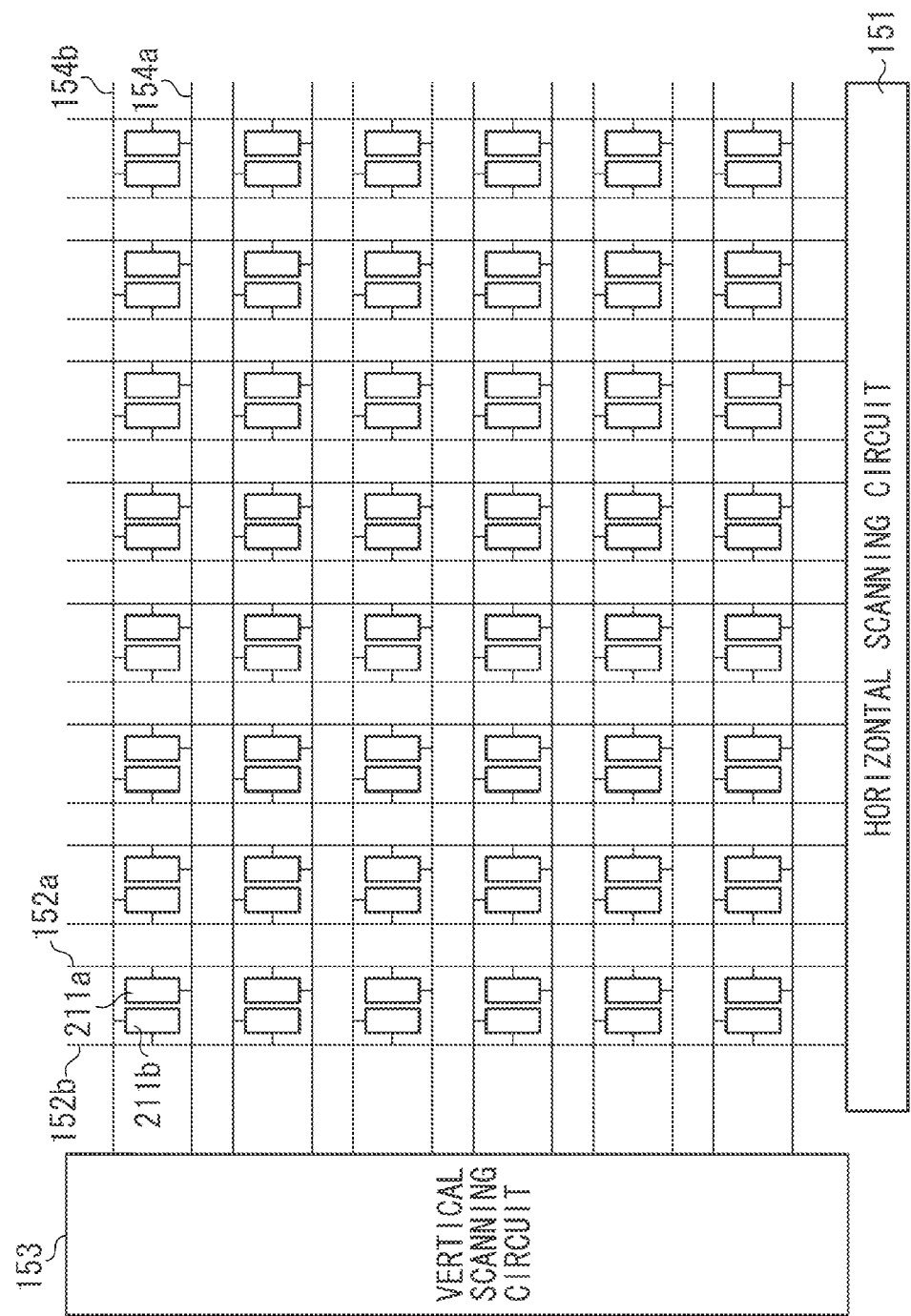
FIG. 3 is a circuit diagram illustrating the image sensor according to the present exemplary embodiment.

FIG. 3 illustrates a configuration of a reading circuit in the image sensor 107 according to the present exemplary embodiment of the present disclosure. The image sensor 107 includes a horizontal scanning circuit 151 and a vertical scanning circuit 153. Horizontal scanning lines 152a and 152b and vertical scanning lines 154a and 154b are wired at the boundary of each pixel, and a signal is read from each photoelectric conversion unit to the outside via the scanning lines.

The image sensor 107 according to the present exemplary embodiment of the present disclosure has the following two types of reading modes. A first reading mode is referred to as an all-pixel reading mode for capturing a high-definition still image. In this case, signals of all the pixels are read.

A second reading mode is referred to as a thinning reading mode for only recording a moving image or displaying a preview image. In this case, the required number of pixels is smaller than the total number of pixels, and thus signals of only the pixels in the pixel group thinned out at a predetermined rate in both the X and Y directions are read.

For a normal captured image, the images A and B only have to be read. In the case of phase difference detection with a plurality of distance measurement areas, an image A signal for AF and an image B signal for AF are read, and an image deviation amount between the images A and B is acquired by correlation calculation to calculate a defocus amount. Thus, since the two images A and B always need to be simultaneously calculated, the plurality of distance measurement areas cannot be subjected to simultaneous calculation. The plurality of distance measurement areas is subjected to calculation processing one by one according to the reading timing of the image sensor.

However, if a distance measurement area is set to one arbitrary frame, correlation calculation processing is possible and the focus lens can be moved to an in-focus position by calculating a defocus amount.

Figure 4:
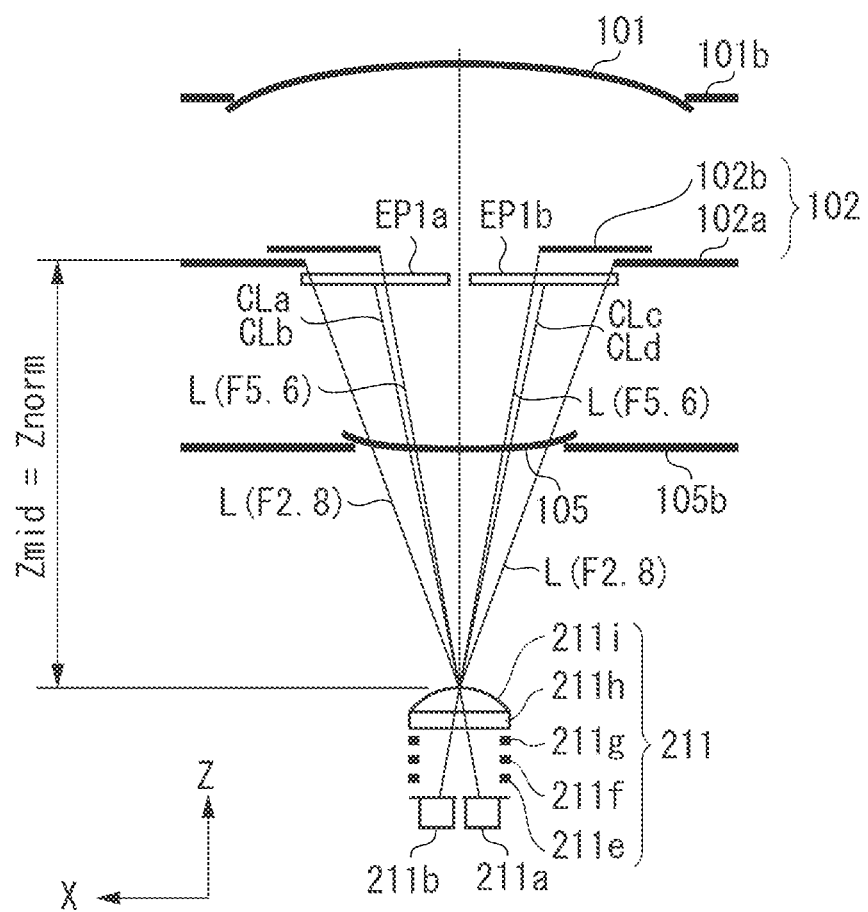
FIG. 4 is a diagram illustrating a distance measurement area according to the present exemplary embodiment.

FIG. 4 illustrates a conjugate relationship between an exit pupil plane of the photographic optical system and the photoelectric conversion units 211a and 211b of the image sensor 107 disposed at an image height of 0, namely, near the center of the image plane in the image capture apparatus according to the exemplary embodiment of the present disclosure. The photoelectric conversion units 211a and 211b in the image sensor and the exit pupil plane of the photographic optical system are designed to be in a conjugate relationship with each other by the on-chip microlens 112i. The exit pupil plane of the photographic optical system almost matches the plane where an iris diaphragm for light amount adjustment is normally disposed. The photographic optical system according to the exemplary embodiment of the present disclosure is a zoom lens having a variable magnification function. Depending on the optical type, when a variable magnification operation is performed, a distance or a size of the exit pupil from the image plane changes. The photographic optical system illustrated in FIG. 4 has a focal distance in the middle between a wide-angle end and a telephoto end, namely, indicates a middle state. The shape of the on-chip microlens 112i is designed by assuming the exit pupil distance Zmid in this state as the standard exit pupil distance Znorm.

FIG. 4 illustrates a conjugate relationship between the pixel 211 and the photographic optical system. The photographic optical system includes the first lend group 101, a lens barrel member 101b for holding the first lens group 101, the third lens group 105, a lens barrel member 105b for holding the third lens group 105, the diagram unit 102, an aperture plate 102a for defining the aperture diameter when the aperture is fully open, and a diaphragm blade 102b for adjusting the aperture diameter when the aperture is reduced. The lens barrel member 101b, the aperture plate 102a, the diaphragm blade 102b, and the lens barrel member 105b function as members for limiting the light flux passing through the photographic optical system and indicate optical virtual images when observed from the image plane. A composite aperture near the diaphragm unit 102 is defined as the lens' exit pupil, and the distance from the image plane is Zmid as described above.

The pixel 211 includes the following members: from the lowermost layer, the photoelectric conversion units 211a and 211b, wiring layers 211e, 211f, and 211g, a color filter 211h, and the on-chip microlens 211i. The photoelectric conversion units 211a and 211b are projected on the exit pupil plane of the photographic optical system by the on-chip microlens 211i to be projected images EP1a and EP1b.

When the diaphragm 102 is fully open (e.g., F2.8), the outermost portion of the light flux passing through the photographic optical system is indicated as L (F2.8), and the projected image EP1a or EP1b is never vignetted at the aperture. On the other hand, when the diaphragm 102 is stopped down (e.g., F5.6), the outermost portion of the light flux passing through the photographic optical system is indicated as L (F5.6), and the periphery of the projected image EP1a or EP1b is vignetted at the aperture. At the center of the image plane, vignetted states of the projected images EP1a and EP1b are symmetrical with respect to an optical axis, and the amount of light received by each of the photoelectric conversion units 211a and 211b is equal to each other.

The image capture apparatus according to the exemplary embodiment of the present disclosure includes the contrast signal processing circuit 125 for generating contrast information in addition to the phase difference calculation processing circuit 124.

(Contrast Detection Method)

The contrast detection method used by a second focus detection unit will be described. The contrast signal processing circuit 125 applies a filter to an image signal of a distance measurement area to determine a high-frequency component of the signal, and generates a contrast evaluation value. The contrast signal processing circuit 125 according to the present exemplary embodiment includes a filter having a plurality of frequency characteristics or a filter having variable frequency characteristics. The contrast signal processing circuit 125 can also generate the peak of a high-frequency component of an object luminance signal, and a difference between maximum and minimum object luminance values.

In the contrast detection method, since an image capture signal is immediately subjected to signal processing via the filter to generate contrast information, it is not necessary to store the image capture signal and the calculation load is light. Thus, a plurality of distance measurement areas can be subjected to simultaneous signal processing without any dependence on the range of distance measurement areas.

The contrast evaluation value generated by the contrast signal processing circuit 125 indicates the sharpness (size of contrast) of video generated based on an output signal from the image sensor 107. The sharpness of an in-focus image is high while the sharpness of a blurred image is low. Thus, the contrast evaluation value can be used as a value indicating a focus state of the photographic optical system. However, unlike the image plane phase difference detection method, since the contrast detection method cannot determine a defocus amount, the position of the focus lens where the contrast evaluation value is at its peak needs to be searched for.

A focusing operation by the contrast detection method is performed by moving the focus lens 105 in a certain direction, searching for a direction where the contrast evaluation value increases, moving the focus lens 105 in this direction to acquire the peak of the contrast evaluation value, and acquiring contrast evaluation values until the contrast evaluation value decreases. To determine an in-focus state, the top three or four points having a larger contrast evaluation value are used. Interpolation calculation is performed based on the focus lens positions corresponding to the points to calculate a focus lens position (in-focus position) having the largest contrast evaluation value. Accordingly, the focus lens 105 can be moved to the in-focus position.

As described above, in the contrast detection method, although the plurality of distance measurement areas can be subjected to simultaneous evaluation, it takes time to retrieve the in-focus position because a defocus amount cannot be determined.

In the present exemplary embodiment, as contrast information, the peak value of a high-frequency component or a difference between maximum and minimum object luminance values can be acquired in addition to the contrast evaluation value. These pieces of information have the advantage of not being easily affected by a color or a pattern of the object. However, the information has the disadvantage of including many noise components, not including an averaged value such as the contrast evaluation value. Thus, the information is not appropriate for the data to be used to obtain an in-focus position.

Next, the distance measurement areas according to the exemplary embodiment of the present disclosure will be described referring to FIGS. 5A, 5B, and 5C. In the present exemplary embodiment, there are a total of 35 distance measurement areas, 5 areas in a vertical direction and 7 areas in a horizontal direction, and a distance measurement area can be set in each area.

(First Determination Method of Distance Measurement Area)

Next, a focus detection method of a plurality of distance measurement areas according to the present exemplary embodiment will be described. In the exemplary embodiment of the present disclosure, contrast information of the plurality of distance measurement areas is first acquired by the contrast detection method capable of simultaneously evaluating the plurality of distance measurement areas. Then, whether a target object is present in each distance measurement area is estimated based on the contrast information of the plurality of distance measurement areas.

For example, distance measurement areas having a higher contrast evaluation value are determined. Only the determined distance measurement areas are subjected to focus detection using the image plane phase difference detection method. Out of the distance measurement areas, the area where the defocus amount indicates the closest distance side is determined as the main area intended by the photographer, and a focus is set on this distance measurement area. Thus, the contrast detection method is used for determining distance measurement areas to be subjected to focus detection among the plurality of distance measurement areas, and focus detection is performed only for the determined distance measurement areas by using the image plane phase difference detection method. By such a focus detection method, a target distance measurement area can be quickly determined even when there is a plurality of distance measurement areas, and the focus lens can be quickly moved to the in-focus position by using the defocus amount obtained by the image plane phase difference detection method. Thus, focusing time can be reduced.

Figure 5A:
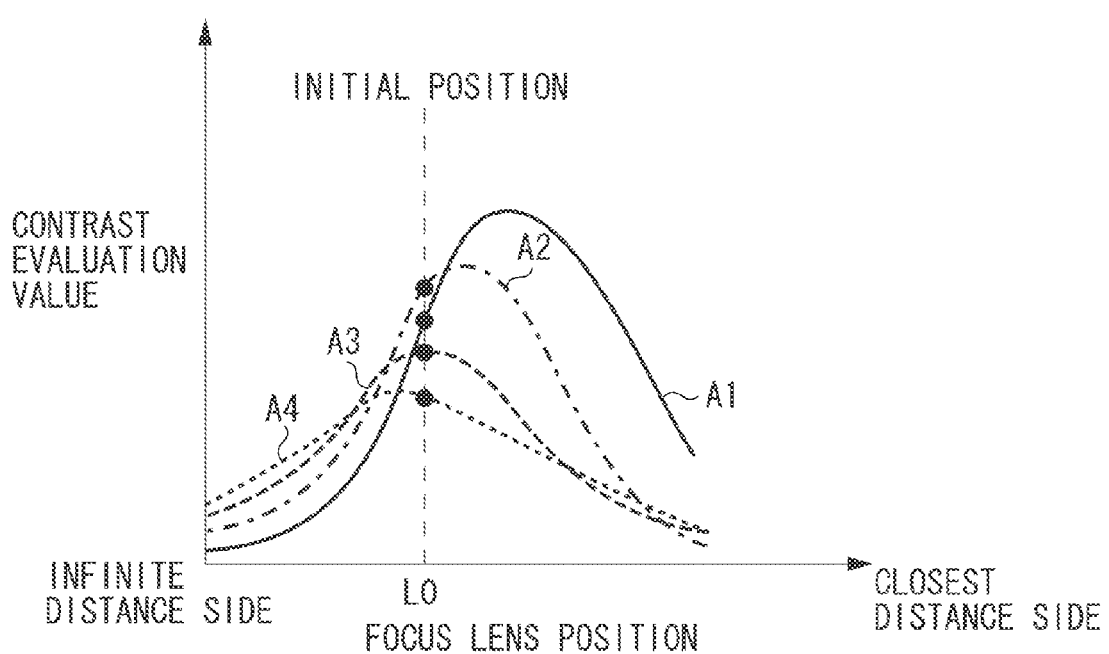
FIGS. 5A, 5B, and 5C are diagrams respectively illustrating contrast information of each distance measurement area according to the present exemplary embodiment, a determination method of the distance measurement area according to the present exemplary embodiment, and contrast information of each distance measurement area according to the present exemplary embodiment.
Figure 5B:
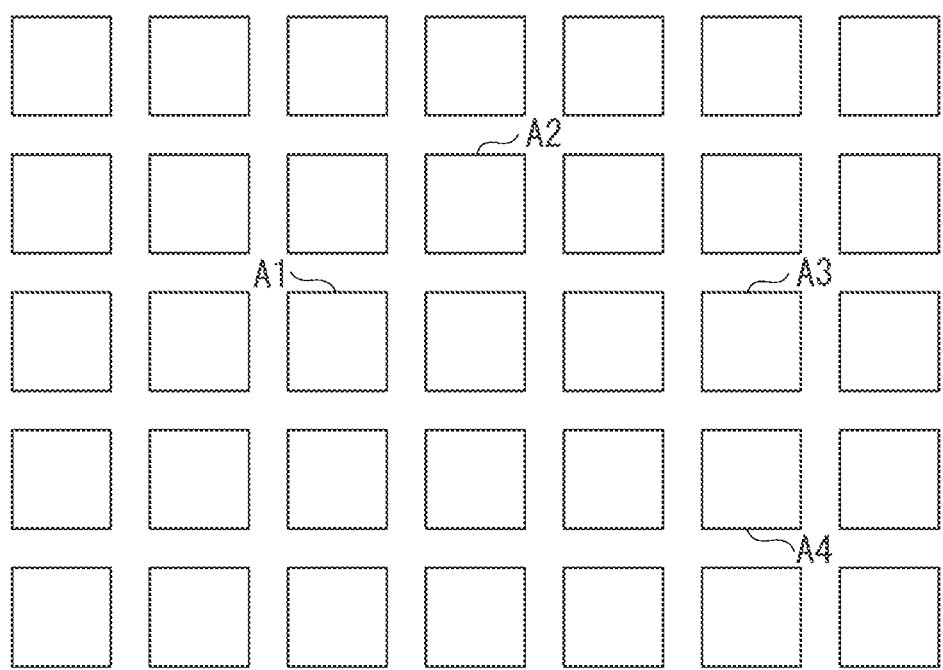
Figure 5C:
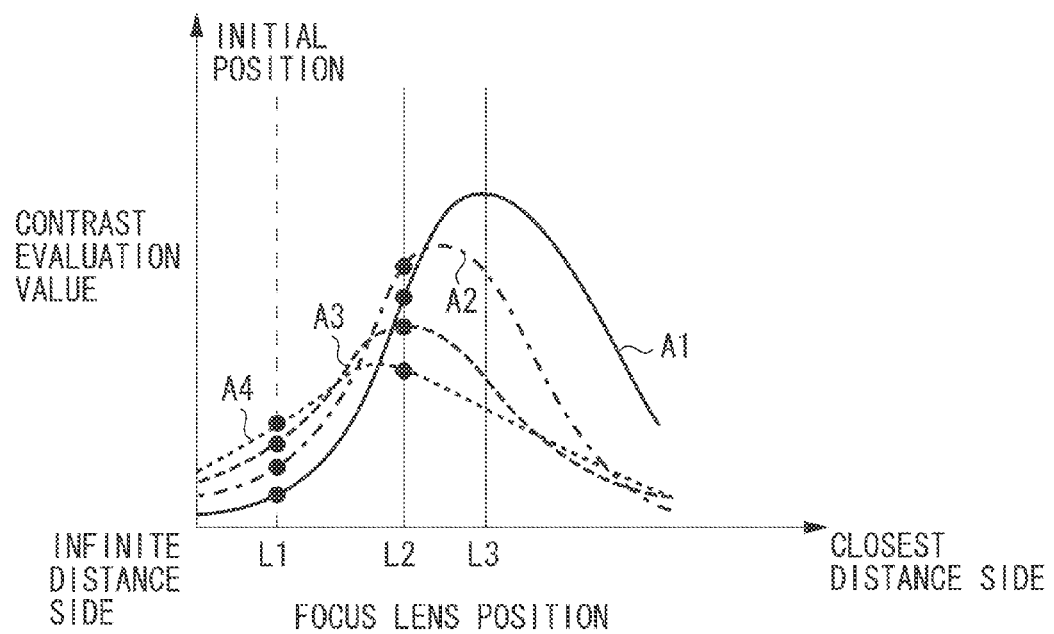

Referring to FIGS. 5A to 5C, a first distance measurement area determination method for determining distance measurement areas to be subjected to focus detection according to the present exemplary embodiment will be described. FIG. 5A is a graph where the horizontal axis indicates focus lens positions and the vertical axis indicates contrast evaluation values. FIG. 5B illustrates the position of the distance measurement area where each evaluation value illustrated in FIG. 5A is calculated. FIG. 5A illustrates evaluation value shapes of distance measurement areas A1, A2, A3, and A4. The object in the distance measurement area A1 has a contrast evaluation value whose peak position is closest to the closest distance side. Thus, it can be estimated that the photographer wishes to focus the camera on the distance measurement area A1 corresponding to this evaluation value.

In the present exemplary embodiment, first, referring to contrast evaluation values in an out-of-focus state, a distance measurement area where a target object is present is estimated among a plurality of distance measurement areas. When the position of a vertical dotted line illustrated in FIG. 5A is the initial position L0 of the focus lens, the distance measurement areas in descending order of contrast evaluation values at this position are A2>A1>A3>A4. Accordingly, the distance measurement areas A2 and A1 having a larger evaluation contrast value are determined as distance measurement areas to be subjected to focus detection.

The area determination unit 141 performs focus detection by using distance measurement areas having the largest contrast evaluation value as contrast information.

The determined distance measurement areas A1 and A2 are subjected one by one to calculation processing by the phase difference calculation processing circuit 124 using the image plane phase difference detection method to calculate a defocus amount.

The distance measurement areas A1 and A2 are compared to each other, and the object in the distance measurement area (A2 in FIG. 5A) where the defocus amount indicates closer to the closest distance side is determined as the main object intended by the photographer, and the focus lens is moved to the in-focus position based on the defocus amount. In this case, however, depending on the initial position of the focus lens, the object on the closest distance side may not be acquired.

Referring to FIG. 5C, a case where the initial position of the focus lens is closer to the infinite distance side than that illustrated in FIG. 5A will be described.

Referring to contrast evaluation values of all the distance measurement areas, distance measurement areas where a target object is present are estimated among the plurality of distance measurement areas. When the position of a vertical dotted line illustrated in FIG. 5C is the initial position L1, the distance measurement areas in descending order of contrast evaluation values at this position are A4>A3>A2>A1. Accordingly, the distance measurement areas A3 and A4 having a larger evaluation contrast value are determined as distance measurement areas to be subjected to focus detection. The determined distance measurement areas A3 and A4 are subjected one by one to calculation processing by the phase difference calculation processing circuit 124 using the image plane phase difference detection method to calculate a defocus amount.

The distance measurement areas A3 and A4 are compared to each other, and the object in the distance measurement area (A3 in FIG. 5C) where the defocus amount indicates closer to the closest distance side is determined as the object closer to the closest distance side, and the focus lens is moved to the in-focus position L2 based on the defocus amount. The contrast evaluation values of all the distance measurement areas are acquired again at the in-focus position L2.

At the in-focus position L2, the distance measurement areas A1 and A2 have a larger contrast evaluation value than the distance measurement area A3. Accordingly, the distance measurement areas A1 and A2 are determined as distance measurement areas to be subjected to focus detection. The determined distance measurement areas A1 and A2 are subjected one by one to calculation processing by the phase difference calculation processing circuit 124 using the image plane phase difference detection method to calculate a defocus amount. The distance measurement areas A1 and A2 are compared to each other, and the object in the distance measurement area (A1 in FIG. 5C) where the defocus amount indicates closer to the closest distance side is determined as the object closer to the closest distance side, and the focus lens is moved to the in-focus position L3 based on the defocus amount.

The contrast evaluation values of all the distance measurement areas are acquired again at the position L3 of the focus lens. When there is no contrast evaluation value larger than that of the distance measurement area A1, the position L3 is set as the in-focus position.

Next, a method for weighting according to the position of a distance measurement area will be described. The method for focusing the camera on the object closest to the closest distance side irrespective of photographer's intention has been described. However, the photographer does not always desire to photograph the object closest to the closest distance side. For example, although a main object to be photographed by the photographer is located in a distance measurement area at the center position, if there is an object in a lowermost left distance measurement area, which is closer to the closest distance side than the main object, the camera is focused on the object closer to the closest distance side. Thus, to meet the photographer's intention, not only the camera needs to be focused on the object closest to the closest distance side, but also weighting needs to be performed depending on the position of a distance measurement area. A specific example will be described below.

Figure 6A:
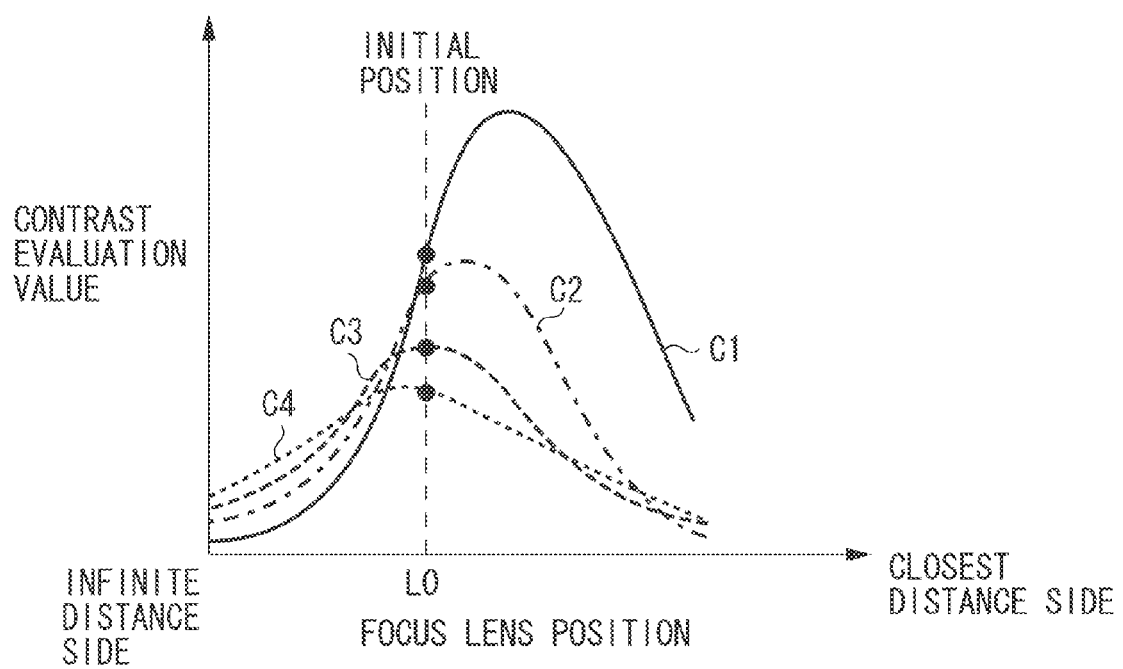
FIGS. 6A, 6B, and 6C are diagrams respectively illustrating contrast information of each distance measurement area according to the present exemplary embodiment, a determination method of the distance measurement area according to the present exemplary embodiment, and weighted contrast information according to the present exemplary embodiment.
Figure 6B:
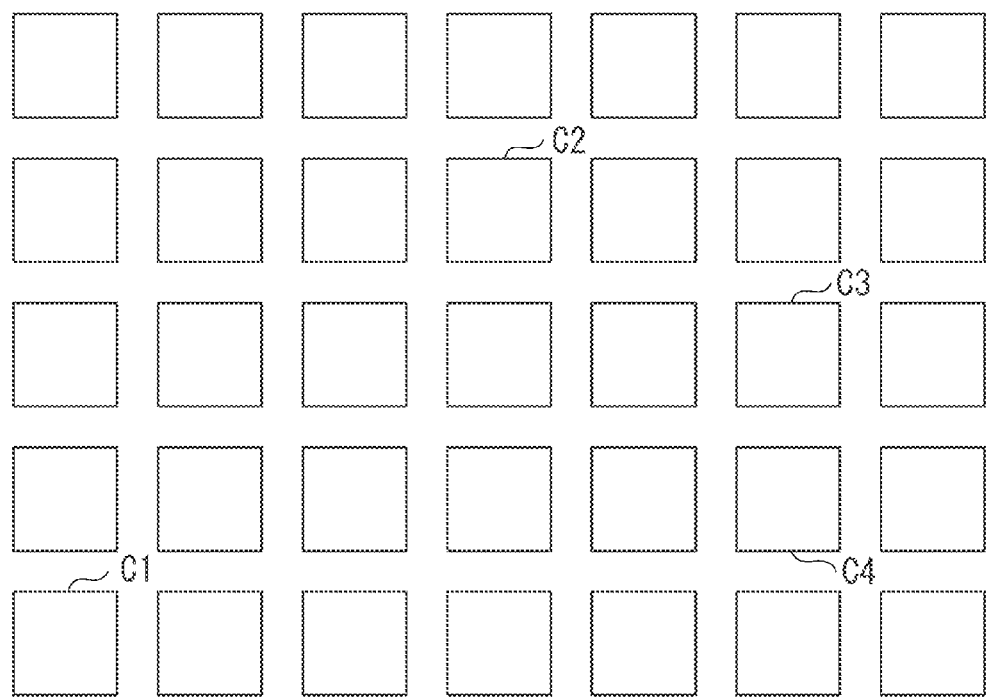

FIG. 6A is a graph where the horizontal axis indicates focus lens positions and the vertical axis indicates contrast evaluation values. FIG. 6B illustrates the position of the distance measurement area where each evaluation value illustrated in FIG. 6A is calculated. FIG. 6A illustrates evaluation value shapes of distance measurement areas C1, C2, C3, and C4. In the present exemplary embodiment, first, referring to contrast evaluation values in an out-of-focus state, a distance measurement area where a target object is present is estimated among the plurality of distance measurement areas. When the position of a vertical dotted line illustrated in FIG. 6A is the initial position L0 of the focus lens, the distance measurement areas in descending order of contrast evaluation values at this position are C1>C2>C3>C4. As illustrated in FIG. 6A, the object in the distance measurement area C1 has a contrast evaluation value whose peak position is closest to the closest distance side. However, as illustrated in FIG. 6B, the position of the distance measurement area C1 is at the lowermost left side and may not be the main object intended by the photographer.

Figure 6C:
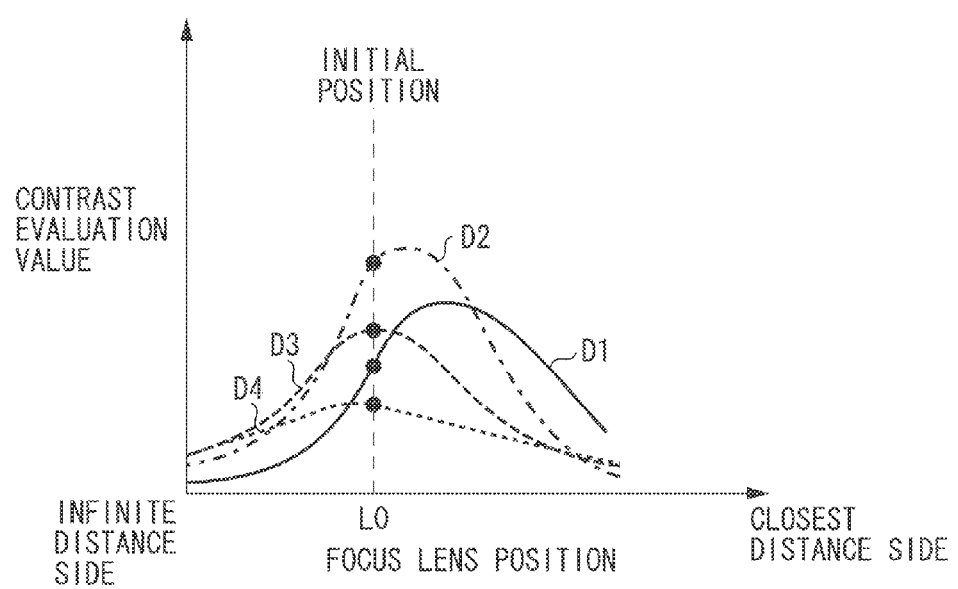

Thus, weighting is performed depending on the position of a distance measurement area. For example, if the contrast evaluation value of a distance measurement area at the center position is multiplied by a coefficient of 1, the coefficient is gradually reduced to 0.8 to 0.6 as a distance measurement area is closer to the periphery. FIG. 6C illustrates a result of weighting contrast evaluation values. When the position of a vertical dotted line illustrated in FIG. 6C is the initial position L0 of the focus lens, the distance measurement areas in descending order of contrast evaluation values at this position are D2>D3>D1>D4. The distance measurement areas D2 and D3 having a larger evaluation contrast value after the weighting depending on the position of a distance measurement area are determined as distance measurement areas to be subjected to focus detection. The determined distance measurement areas D2 and D3 are subjected one by one to calculation processing by the phase difference calculation processing circuit 124 using the image plane phase difference detection method to calculate a defocus amount.

As described above, by weighting the contrast evaluation values depending on the position of a distance measurement area and then determining the distance measurement areas to be subjected to focus detection using the image plane phase difference detection method, the camera can be quickly focused on the main object that is more likely to be intended by the photographer.

Figure 7A:
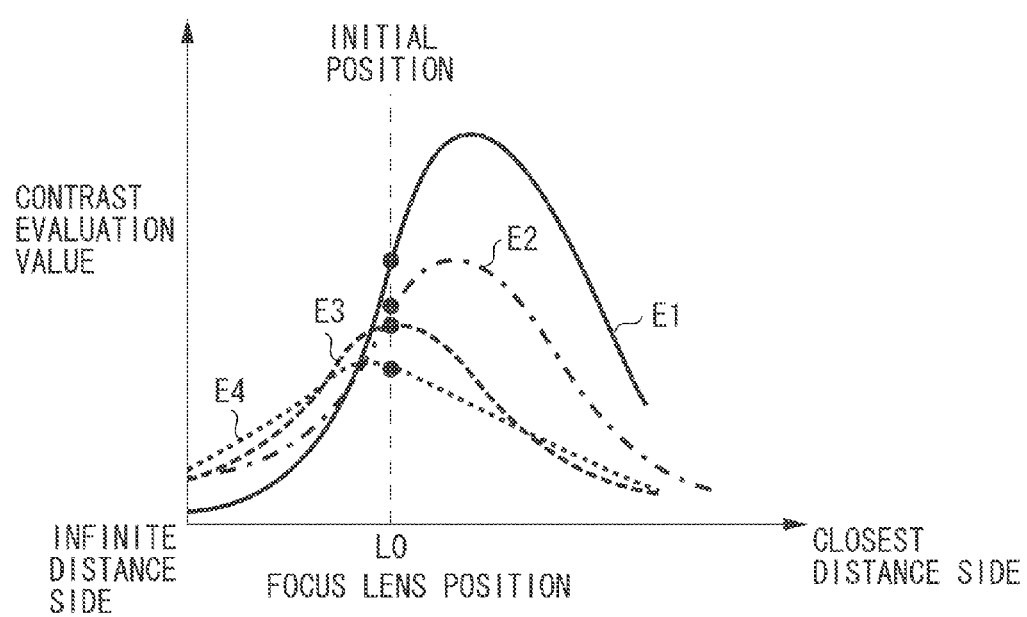
FIGS. 7A and 7B are diagrams respectively illustrating contrast information of each distance measurement area according to the present exemplary embodiment, and a determination method of the distance measurement area according to the present exemplary embodiment.
Figure 7B:
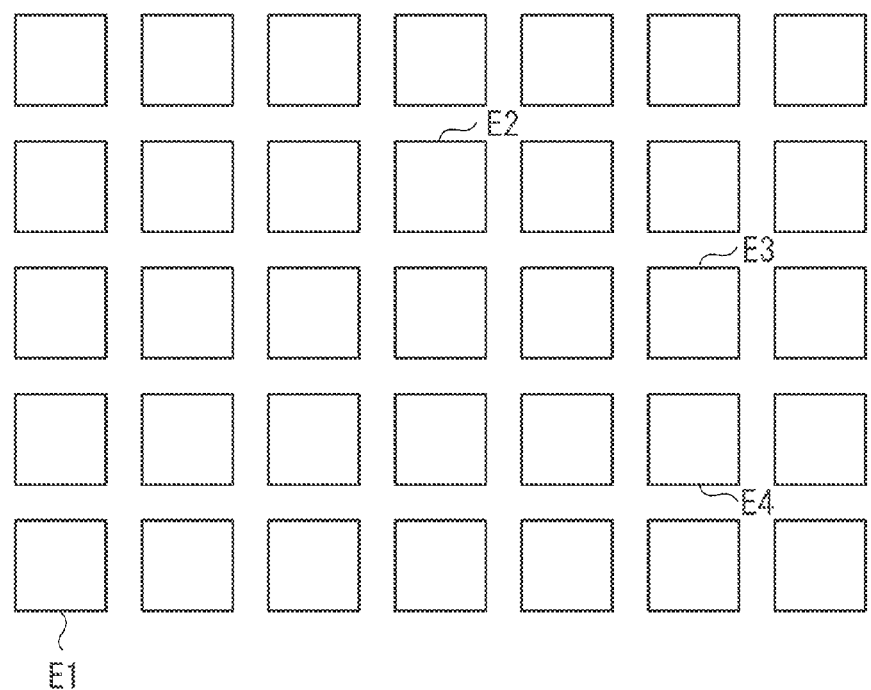

Another weighting method for selecting a distance measurement area will be described. In the above description, weighting is performed before selecting the distance measurement areas to be subjected to focus detection. However, weight can be placed on the defocus amounts detected using the image plane phase difference detection method after the areas are selected. FIG. 7A is a graph where the horizontal axis indicates focus lens positions and the vertical axis indicates contrast evaluation values. FIG. 7B illustrates the position of the distance measurement area where each evaluation value illustrated in FIG. 7A is calculated.

In FIG. 7A, the distance measurement areas in descending order of contrast evaluation values are E1>E2>E3>E4, and the distance measurement areas E1 and E2 are selected as distance measurement areas to be subjected to focus detection. A defocus amount is detected for the distance measurement areas E1 and E2 using the image plane phase difference detection method. If only a defocus amount is detected to obtain an in-focus position, the camera is focused on the distance measurement area E1 at the lowermost left side instead of the distance measurement area E2 at the center position. Thus, the distance measurement areas are compared by using a corrected defocus value obtained by multiplying the defocus amount by the coefficient corresponding to the position of a distance measurement area.

When a coefficient for weighting is 1, the coefficient is gradually reduced to 0.8 to 0.6 as a distance measurement area is closer to the periphery. Thus, although the defocus amount of the distance measurement area E1 is large because of the object closest to the closest distance side, the coefficient is lowest because the distance measurement area E1 is positioned at the lowermost left side. As a result, the defocus amount is reduced by correction, namely, multiplying the defocus amount by the coefficient. Conversely, the distance measurement area E2 has a defocus amount slightly smaller than that of the distance measurement area E1. However, the coefficient is larger than that of the distance measurement area E1 because the distance measurement area E2 is positioned in the center area. Thus, when the corrected defocus amounts are compared to each other, the distance measurement area E2 has the larger value.

In other words, by placing more weight on the contrast information of a distance measurement area at the center position than the contrast information of a distance measurement area at the peripheral position, the area determination unit 141 determines a distance measurement area to be subjected to phase difference type focus detection for detecting a deviation amount between a pair of object images acquired from output signals output from the image capture unit.

As described above, selecting a distance measurement area by placing weight on the defocus amounts of the distance measurement areas by multiplying the amounts by the coefficient corresponding to the position of each of the areas and then comparing the areas allows the camera to be quickly focused on the main object that is more likely to be intended by the photographer.

(Second Determination Method of Distance Measurement Area)

Next, a second distance measurement area determination method used when the number of distance measurement areas to be subjected to simultaneous calculation processing by the image plane phase difference detection method is one frame or more (four frames in the present exemplary embodiment) will be described referring to FIGS. 8A and 8B.

FIG. 8A is a graph where the horizontal axis indicates focus lens positions and the vertical axis indicates contrast evaluation values. FIG. 8B illustrates the position of the distance measurement area where each evaluation value illustrated in FIG. 8A is calculated.

FIG. 8A illustrates evaluation value shapes of distance measurement areas F1, F2, F3, and F4. The object in the distance measurement area F2 has a contrast evaluation value whose peak position is closest to the closest distance side. Thus, it can be estimated that the photographer wishes to focus the camera on the distance measurement area F2 corresponding to this contrast evaluation value.

In the present exemplary embodiment, first, referring to contrast evaluation values in an out-of-focus state, a distance measurement area having a high presence probability of an object is estimated among the plurality of distance measurement areas. When the position of a vertical dotted line illustrated in FIG. 8A is the initial position of the focus lens, the distance measurement areas in descending order of contrast evaluation values in this position are F3>F1>F2>F4. Accordingly, the distance measurement areas F3 and F1 having a higher evaluation contrast value are determined as distance measurement areas to be subjected to focus detection.

In the present exemplary embodiment, the four frames of the distance measurement areas can be subjected to simultaneous focus detection by the image plane phase difference detection method. Thus, when a distance measurement area is selected, a distance measurement area G1 is selected to include the distance measurement area F2 adjacent to the distance measurement area F3 and having the third largest contrast evaluation value. Further, since the distance measurement areas F1 and F4 are adjacent to each other, a distance measurement area G2 including the distance measurement areas F1 and F4 is determined to be subjected to focus detection.

Then, defocus amounts are calculated by the image plane phase difference detection method, and compared to each other. The focus lens is moved with respect to the defocus amount of the distance measurement area F2 closer to the closest distance side to focus the camera. Contrast evaluation values are acquired again. When there is no distance measurement area having a contrast evaluation value larger than that of the distance measurement area F2, the focusing operation is ended, or distance measurement areas are determined again.

In other words, a distance measurement area determined by the second distance measurement area determination method based on the contrast information, as the distance measurement area to be subjected to focus detection, and a distance measurement area adjacent to the distance measurement area are determined as distance measurement areas to be subjected to focus detection by the second distance measurement area determination method.

As described above, by determining the distance measurement areas to be subjected to focus detection based on the contrast information and comparing the defocus amounts of the determined distance measurement areas to each other using the image plane phase difference detection method, the position of a target object closer to the closest distance side can be quickly identified. As a result, focusing time can be reduced even in the case of a plurality of distance measurement areas.

In the present exemplary embodiment, the contrast evaluation value is used as an example of the contrast information. However, a difference between maximum and minimum object luminance values or a peak value of object luminance can be used.

The difference between the maximum and minimum object luminance values is largest at the in-focus position. However, since a luminance difference is generated even in the case of great blurring, the luminance difference can be detected in the case of a greatly blurred object.

In other words, presence or absence of an object can be estimated based on whether there is a contrast difference in object luminance in a distance measurement area. Thus, only distance measurement areas having a large contrast difference in object luminance can be selected from all the areas, and set as areas to be subjected to focus detection by the image plane phase difference detection method.

In the present exemplary embodiment, the method for determining the distance measurement areas to be subjected to focus detection by the image plane phase difference detection method has been described. A distance measurement area determination method used when the object includes a human face will be described.

A face area can be determined by face detection even in a defocus state.

As illustrated in FIG. 9A, when a face is within one frame of a distance measurement area, the distance measurement area is selected as in the case of the above-described first distance measurement area determination method. As illustrated in FIG. 9B, when the size of a face is over a plurality of distance measurement areas, according to the above-described second distance measurement area determination method, distance measurement areas to be subjected to focus detection are selected to cover the entire face therewith. Thus, if the main object is a face, by changing the method for determining the distance measurement areas to be subjected to focus detection depending on the size of the face, distance measurement areas are selected to cover the entire face therewith. As a result, the camera can be quickly focused on the main object that is more likely to be intended by the photographer.

In other words, when the image capture apparatus includes the CPU 121 serving as an object detection area identification unit for identifying an object detection area based on object information acquired from the output signal output from the image capture unit, and the object detection area is over a plurality of distance measurement areas, focus detection is performed by the second distance measurement area determination method using the plurality of distance measurement areas.

(Flowchart of Distance Measurement Area Selection)

Next, referring to FIG. 10, a flowchart of the first distance measurement area determination method illustrated in FIGS. 5A to 5C and the second distance measurement area determination method illustrated in FIGS. 8A and 8B will be described. In step S101, the processing is started. In step S102, the photographer selects whether there is a plurality of distance measurement areas or there is one distance measurement area using the area determination unit 141. If there is one distance measurement area (NO in step S102), the processing proceeds to step S104. If there is a plurality of distance measurement areas (YES in step S102), the processing proceeds to step S103.

In step S103, whether a switch SW1 is turned on indicating a half-pressed state of a release switch is determined. If the switch SW1 is off (NO in step S103), the processing returns to step S103. If the switch SW1 is on (YES in step S103), the processing proceeds to step S106. In step S104, as in step S103, if the switch SW1 is off (NO in step S104), the processing returns to step S104. If the switch SW1 is on (YES in step S104), the processing proceeds to step S105. In step S105, since the number of distance measurement areas is one, the defocus amount of one area is calculated by the image plane phase difference detection method, and the processing proceeds to step S112.

In step S106, the image capture unit performs reading once, and the processing proceeds to step S107. In step S106, contrast information of each of the plurality of distance measurement areas is acquired by the contrast detection method, and the processing proceeds to step S107. Step S107 will be described in detail below. In step S107, the pieces of contrast information of the respective distance measurement areas acquired in step S106 are compared, and the processing proceeds to step S108. Step S108 will be described in detail below. In step S108, based on the pieces of contrast information of the respective distance measurement areas compared in step S107, a plurality of distance measurement areas to be subjected to phase difference focus detection is determined, and the processing proceeds to step S109.

In step S109, the image capture unit performs reading a plurality of times, and the processing proceeds to step S110. Step S110 will be described in detail below. In step S109, the plurality of distance measurement areas determined in step S108 is focus-detected by performing reading a plurality of times, and the processing proceeds to step S110. In step S110, the defocus amounts of the respective distance measurement areas calculated in step S109 are compared to each other, and the processing proceeds to step S111. In step S111, one distance measurement area where the defocus amount indicates closest to the closest distance side is determined based on the defocus amounts of the respective distance measurement areas compared to each other in step S110, and the processing proceeds to step S112. In step S112, the focus lens is moved to an in-focus position based on the defocus amount of the distance measurement area determined in step S111, and the processing proceeds to step S113. In step S113, the lens is stopped at the in-focus position, and the processing proceeds to step S114.

In step S114, contrast information of each distance measurement area is acquired again, and the processing proceeds to step S115. In step S105, if there is a distance measurement area having contrast larger than that of one distance measurement area determined in step S111, the processing returns to step S106. If there is no distance measurement area having contrast larger than that of one distance measurement area determined in step S111, the processing proceeds to step S116 to be ended.

Figure 11A:
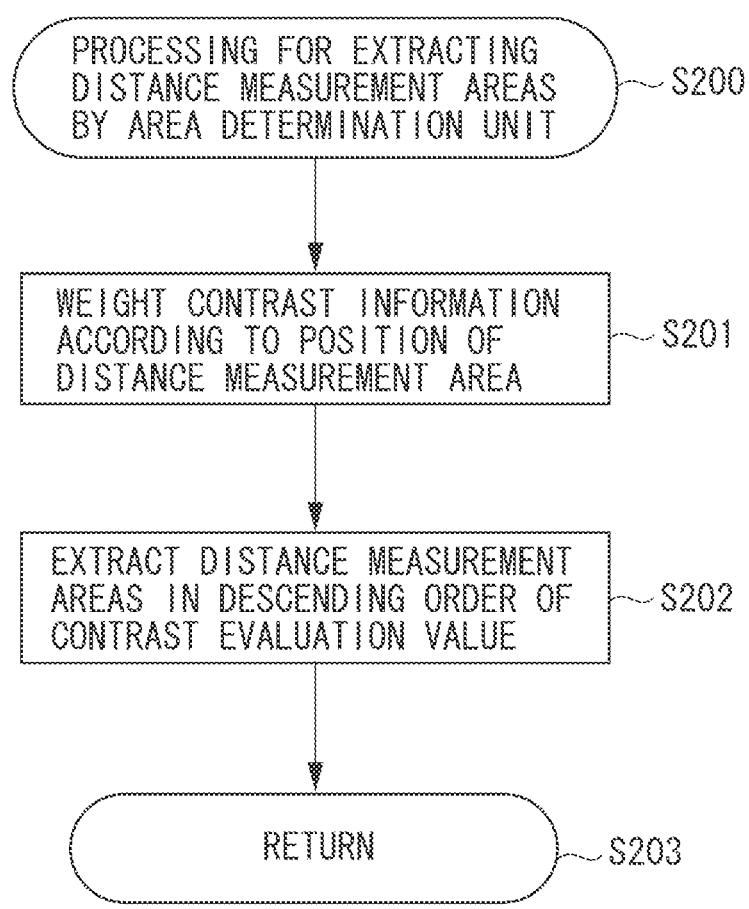
FIGS. 11A, 11B, and 11C are sub-flowcharts according to the present exemplary embodiment.

Referring to FIG. 11A, the subflowchart of the processing in step S107 illustrated in FIG. 10 for determining the distance measurement areas by the area determination unit 141 will be described. In step S201, the contrast information is weighted depending on the position of a distance measurement area, and the processing proceeds to step S202. In step S202, the distance measurement areas are determined in descending order of contrast evaluation values, and the processing proceeds to step S203. The processing for determining the distance measurement areas by the area determination unit 141 is ended.

Figure 11B:
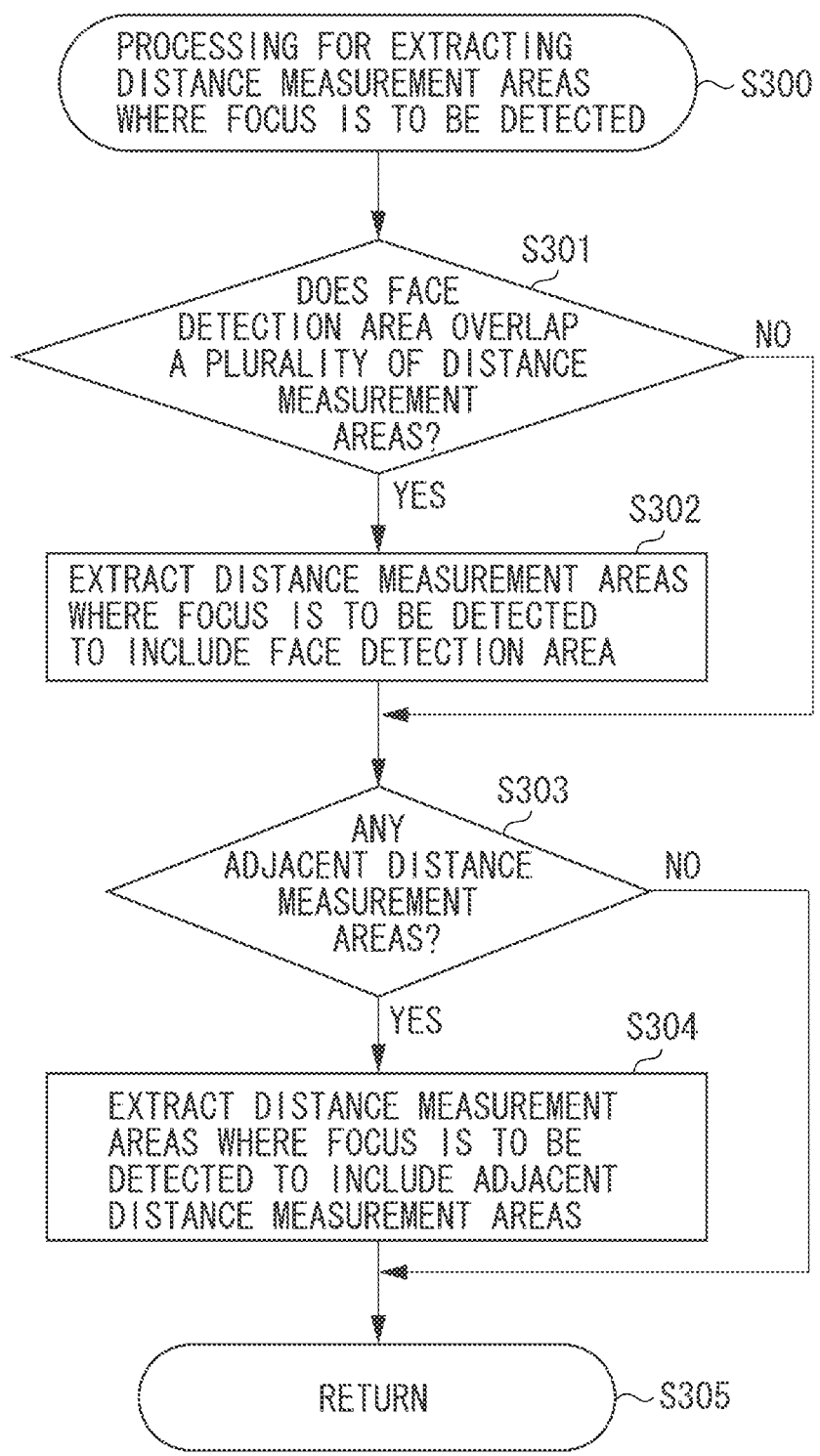

Next, referring to FIG. 11B, the processing in step S108 of FIG. 10 for determining the distance measurement area to be subjected to focus detection will be described. In step S301, if a face detection area is over a plurality of distance measurement areas (YES in step S301), the processing proceeds to step S302. If a face detection area is not over a plurality of distance measurement areas (NO in step S301), the processing proceeds to step S303. In step S302, the distance measurement areas to be subjected to focus detection are determined to include the face detection area, and the processing proceeds to step S303.

In step S303, whether the distance measurement areas determined by the area determination unit 141 include adjacent distance measurement areas is determined. If adjacent distance measurement areas are included (YES in step S303), the processing proceeds to step S304. If adjacent distance measurement areas are not included (NO in step S303), the processing proceeds to step S305. In step S304, distance measurement areas to be subjected to focus detection are determined to include the adjacent distance measurement areas, and the processing proceeds to step S305. In step 305, the processing for determining the distance measurement areas to be subjected to focus detection is ended.

Figure 11C:
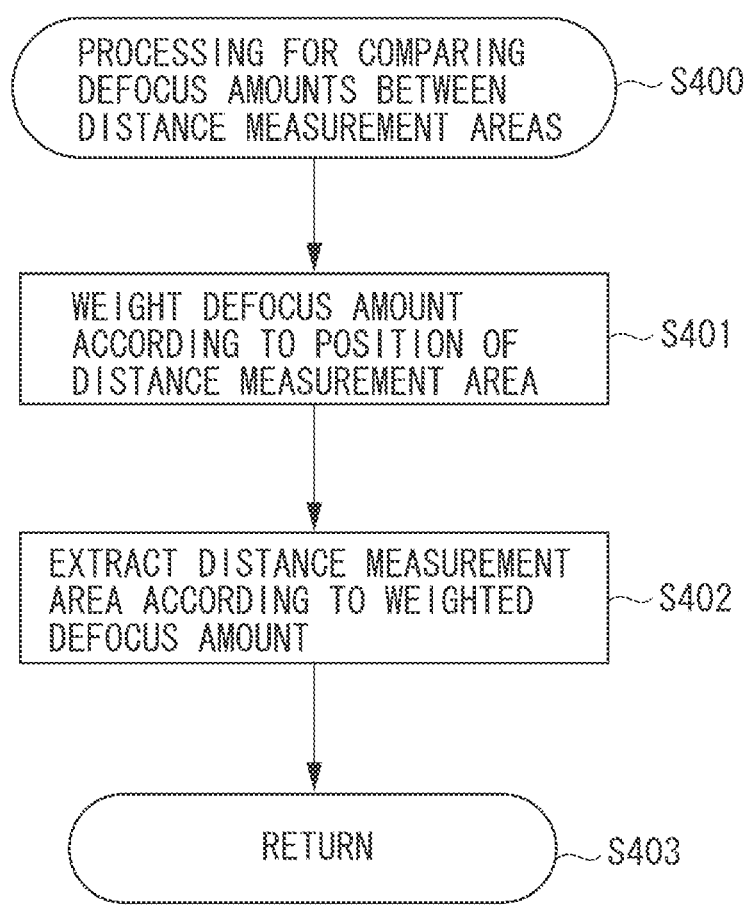

Next, referring to FIG. 11C, the processing in step S110 of FIG. 10 for comparing the defocus amounts of the distance measurement areas subjected to focus detection will be described. In step S401, the defocus amounts are weighted depending on the position of a distance measurement area, the processing proceeds to step S402. In step S402, distance measurement areas are determined according to the weighted defocus amounts, and the processing proceeds to step S403. The processing for comparing the defocus amounts of the distance measurement areas subjected to focus detection is ended.

According to the exemplary embodiment of the present disclosure, the image capture apparatus including the image sensor capable of performing phase difference detection can reduce focusing time when there is a plurality of distance measurement areas.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-022395 filed Feb. 7, 2013, which is hereby incorporated by reference herein in its entirety.

What is claimed is:

1. An image capture apparatus comprising:
an image capture unit;
a first focus detection unit configured to perform phase difference type focus detection for detecting a deviation amount between a pair of object images acquired from output signals output from the image capture unit;
a second focus detection unit configured to perform contrast type focus detection for detecting contrast information of an object image acquired from an output signal output from the image capture unit;
a contrast information generation unit configured to generate the contrast information in a plurality of distance measurement areas subjected to focus detection by the second focus detection unit;
an object detection area identification unit configured to identify an object detection area based on object information acquired from an output signal output from the image capture unit; and
an area determination unit configured to determine, based on the contrast information, a distance measurement area to be subjected to focus detection by the first focus detection unit,
wherein if the object detection area is over the plurality of distance measurement areas, focus detection is performed by the first focus detection unit using the plurality of distance measurement areas which the object detection area is over, and
if the object detection area is not over the plurality of distance measurement areas, focus detection is performed by the first focus detection unit using a simile distance measurement area of the plurality of distance measurement areas.

2. The image capture apparatus according to claim 1, wherein the contrast information generated by the contrast information generation unit is a contrast evaluation value.

3. The image capture apparatus according to claim 2, wherein the area determination unit performs focus detection by the first focus detection unit using a distance measurement area where the contrast evaluation value is largest.

4. The image capture apparatus according to claim 1, wherein the area determination unit determines that a distance measurement area determined as the distance measurement area to be subjected to focus detection by the first focus detection unit based on the contrast information and a distance measurement area close to the determined distance measurement area are distance measurement areas to be subjected to focus detection by the first focus detection unit.

5. The image capture apparatus according to claim 1, wherein the area determination unit is configured to, by placing more weight on contrast information of the distance measurement area at a center position than contrast information of the distance measurement area at a peripheral position, determine a distance measurement area to be subjected to focus detection by the first focus detection unit.

6. An image capture method comprising:
performing phase difference type focus detection for detecting a deviation amount between a pair of object images acquired from output signals output from an image capture unit;
performing contrast type focus detection for detecting contrast information of an object image acquired from an output signal output from the image capture unit;
generating the contrast information in a plurality of distance measurement areas subjected to the contrast type focus detection;
identifying an object detection area based on object information acquired from an output signal output from the image capture unit; and
determining, based on the contrast information, a distance measurement area to be subjected to the phase difference type focus detection,
wherein if the object detection area is over the plurality of distance measurement areas, focus detection is performed by the first focus detection unit using the plurality of distance measurement areas which the object detection area is over, and
if the object detection area is not over the plurality of distance measurement areas, performing focus detection using a single distance measurement area of the plurality of distance measurement areas.

7. A non-transitory storage medium storing a program to cause a computer to execute a method comprising:
   performing phase difference type focus detection for detecting a deviation amount between a pair of object images acquired from output signals output from an image capture unit;
   performing contrast type focus detection for detecting contrast information of an object image acquired from an output signal output from the image capture unit;
   generating the contrast information in a plurality of distance measurement areas subjected to the contrast type focus detection;
   identifying an object detection area based on object information acquired from an output signal output from the image capture unit; and
   determining, based on the contrast information, a distance measurement area to be subjected to the phase difference type focus detection,
   wherein if the object detection area is over the plurality of distance measurement areas, focus detection is performed by the first focus detection unit using the plurality of distance measurement areas which the object detection area is over, and
   if the object detection area is not over the plurality of distance measurement areas, performing focus detection using a single distance measurement area of the plurality of distance measurement areas.

* * * * *